United States Patent
Yamada et al.

(10) Patent No.: US 12,444,096 B2
(45) Date of Patent: Oct. 14, 2025

(54) INFORMATION PROCESSING APPARATUS AND NON-TRANSITORY COMPUTER READABLE MEDIUM STORING PROGRAM

(71) Applicant: FUJIFILM Business Innovation Corp., Tokyo (JP)

(72) Inventors: Kenji Yamada, Kanagawa (JP); Takaharu Sato, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 341 days.

(21) Appl. No.: 17/897,213

(22) Filed: Aug. 28, 2022

(65) Prior Publication Data

US 2023/0290016 A1   Sep. 14, 2023

(30) Foreign Application Priority Data

Mar. 9, 2022   (JP) ................................ 2022-036607

(51) Int. Cl.
    *G06T 11/00*   (2006.01)
(52) U.S. Cl.
    CPC ................................ *G06T 11/001* (2013.01)
(58) Field of Classification Search
    None
    See application file for complete search history.

(56) References Cited

U.S. PATENT DOCUMENTS

| | | | |
|---|---|---|---|
| 2010/0289878 A1* | 11/2010 | Sato | H04N 13/239 348/46 |
| 2019/0164315 A1* | 5/2019 | Inoshita | G06T 15/50 |
| 2020/0342629 A1* | 10/2020 | Kuwada | G06T 7/90 |
| 2021/0012149 A1* | 1/2021 | Yamamoto | H04N 23/61 |
| 2021/0132890 A1 | 5/2021 | Horikawa et al. | |

FOREIGN PATENT DOCUMENTS

JP   2021071964   5/2021

OTHER PUBLICATIONS

"Notice of Reasons for Refusal of Japan Counterpart Application", issued on Aug. 26, 2025, with English translation thereof, p. 1-p. 3.

* cited by examiner

*Primary Examiner* — Leon Viet Q Nguyen
(74) *Attorney, Agent, or Firm* — JCIPRNET (57) ABSTRACT

An information processing apparatus includes a processor configured to acquire a plural pieces of image data generated by scanning a surface of an object at least two times while changing a light source, in a case where a result of collation of first image data generated by first scanning using a first light source with second image data generated by second scanning using a second light source different from the first light source is included within an allowable range, combine the first image data and the second image data, and in a case where the result of collation of the first image data with the second image data is not included within the allowable range, collate third image data generated by third scanning performed using the first light source with the second image data, and in a case where a result of the collation is included within the allowable range, combine the second image data and the third image data.

9 Claims, 3 Drawing Sheets

FIG. 1

DIFFUSE REFLECTION IMAGE
SPECULAR REFLECTION IMAGE

FIG. 4

INFORMATION PROCESSING APPARATUS AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2022-036607 filed Mar. 9, 2022.

BACKGROUND (i) Technical Field

The present invention relates to an information processing apparatus and a non-transitory computer readable medium storing a program.

(ii) Related Art

As described in JP2021-71964A, a technique (for example, a texture scanner) that expresses a texture (for example, a glossy feeling or a rugged feeling) of a surface of an object with an image is known. In the technique, two times of scanning, that is, scanning using a diffuse reflection light source and scanning using a regular reflection light source are performed, and two pieces of image data generated by scanning are combined, whereby image data expressing the texture of the surface of the object is generated.

SUMMARY

To generate image data expressing the texture of the surface of the object, there is a need to perform scanning two times. In a case where a position of an object to be a target of scanning is changed between the two times of scanning, the reproducibility of the texture expressed by combination of the two pieces of image data is degraded compared to a case where the position of the object is not changed. In this case, restarting two times of scanning is considered, and as a result, there is a need to perform at least four times of scanning in total.

Aspects of non-limiting embodiments of the present disclosure relate to an information processing apparatus and a non-transitory computer readable medium storing a program that, in a case where two pieces of image data generated by scanning a surface of an object at least two times while changing a light source are combined to generate image data expressing a texture of the object, reduces the number of times of scanning to be restarted and generates image data expressing the texture of the object in a case where a position of the object is changed between the two times of scanning compared to a case where two times of scanning are constantly restarted again after two times of scanning.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a processor configured to acquire a plurality of pieces of image data generated by scanning a surface of an object at least two times while changing a light source, in a case where a result of collation of first image data generated by first scanning using a first light source with second image data generated by second scanning using a second light source different from the first light source is included within an allowable range, combine the first image data and the second image data, and in a case where the result of collation of the first image data with the second image data is not included within the allowable range, collate third image data generated by third scanning performed using the first light source with the second image data, and in a case where a result of the collation is included within the allowable range, combine the second image data and the third image data.

BRIEF DESCRIPTION OF THE DRAWINGS

Exemplary embodiment(s) of the present invention will be described in detail based on the following figures, wherein.

DETAILED DESCRIPTION

Figure 1:
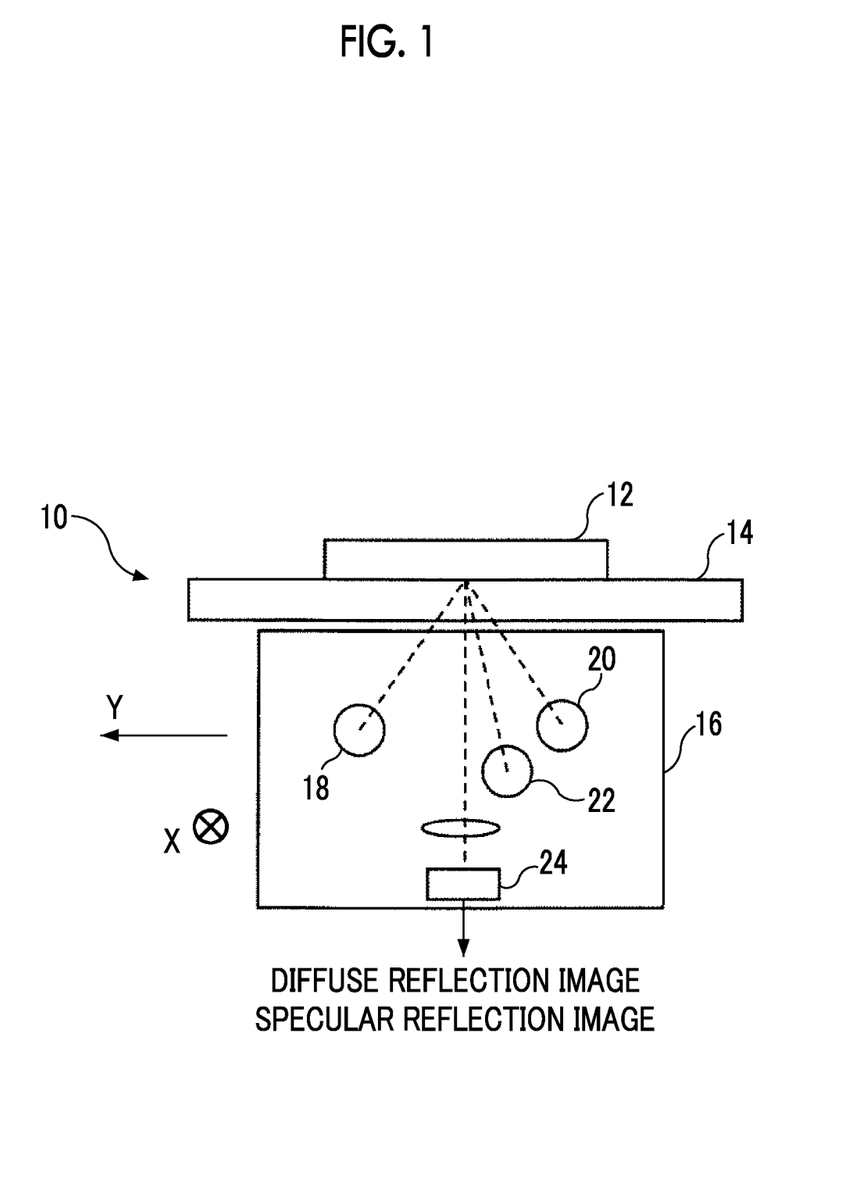
FIG. 1 is a diagram showing the configuration of a scanner.

A scanner 10 according to an exemplary embodiment will be described referring to FIG. 1. FIG. 1 shows an example of the configuration of the scanner 10 according to the exemplary embodiment. The scanner 10 is a scanner that acquires image data representing a surface of an object 12, and may be referred to as a texture scanner.

The scanner 10 optically scans a characteristic of the surface of the object 12 and generates image data representing a result of scanning. The image data generated by the scanner 10 includes image data (hereinafter, referred to as "diffuse reflection image data") based on diffusely reflected light and image data (hereinafter, referred to as "specular reflection image data") based on specularly reflected light.

The diffuse reflection image data is image data representing a light component diffusely reflected by the surface of the object 12. The specular reflection image data is image data representing a light component specularly reflected by the surface of the object 12.

Specular reflection is reflection where an incidence angle and a reflection angle of light are the same angle with respect to a reflection surface, and is also referred to as regular reflection. Accordingly, the specular reflection image data is the same as regular reflection image data.

The scanner 10 includes a platen glass 14, a carriage 16, light sources 18, 20, and 22, and a sensor 24.

The scanner 10 has each configuration shown in the drawing at a width determined in a direction (X direction) perpendicular to the paper plane. The X direction is a main scanning direction of the scanner 10. A direction (Y direction) indicated by an arrow in FIG. 1 is a sub-scanning direction of the scanner 10.

The platen glass 14 is not limited to a glass plate, and may be, for example, an acrylic plate. Though not shown in FIG.

1, a platen cover that covers the platen glass 14 to block external light and encloses the object 12 may be provided.

The carriage 16 is configured to move in the sub-scanning direction at a speed determined in advance at the time of optically scanning the characteristic of the surface of the object 12. Hereinafter, the direction (Y direction) in which the carriage 16 moves is referred to as a front side direction, and a direction on an opposite side is referred to as a rear side direction. Inside the carriage 16, the light sources 18, 20, and 22 are provided.

The light source 18 is a light source provided on a front side and irradiates the object 12 with light for detecting diffusely reflected light from the object 12. Specifically, the light source 18 irradiates the object 12 with light having an incidence angle of a first incidence angle (for example, 45°) with respect to a normal direction of the object 12.

The light source 20 is a light source provided on a rear side and irradiates the object 12 with light for detecting diffusely reflected light from the object 12. Specifically, the light source 20 irradiates the object 12 with light having an incidence angle of a first incidence angle (for example, 45°) with respect to a normal direction of the object 12.

The light source 22 is a light source provided on the rear side and irradiates the object 12 with light for detecting specularly reflected light from the object 12. Specifically, the light source 22 irradiates the object 12 with light having an incidence angle of a second incidence angle (for example, 10°) with respect to the normal direction of the object 12.

The light source 22 is provided at a position where a principal ray of reflected light from the object 12 is not blocked. An incidence angle of light emitted from the light source 22 may be about 5° to 10°. A component traveling in the normal direction of the object 12 in reflected light of light emitted from the light source 22 is detected.

As the light source 22, for example, a fluorescent lamp or a rare gas fluorescent lamp (for example, a xenon fluorescent lamp) is used. The light source 22 may be a light source consisting of a plurality of white light emitting diodes (LEDs) arranged in the main scanning direction. In this case, a luminance distribution in the main scanning direction may be made uniform using a diffusion plate or the like.

In the example shown in FIG. 1, although three light sources (that is, the light sources 18, 20, and 22) are provided inside the carriage 16, one light source may be provided inside the carriage 16, and respective light may be generated by branching light from one light source.

Inside the carriage 16, an image-forming optical system and a sensor 24 are further provided. The image-forming optical system includes a reflection mirror or a coupler lens, and image-forms diffusely reflected light and specularly reflected light from the object 12 on the sensor 24.

The sensor 24 receives diffusely reflected light and specularly reflected light image-formed by the image-forming optical system and generates image data based on the received light. The sensor 24 is configured with, for example, a light-receiving element, such as a charge coupled device (CCD) linear image sensor or a complementary MOS (CMOS) image sensor, and converts the received light into data representing the intensity of the received light. The sensor 24 has a color filter, and generates data representing the color of the object 12. The sensor 24 outputs diffuse reflection image data obtained by receiving diffusely reflected light and specular reflection image data obtained by receiving specularly reflected light. For example, the diffuse reflection image data and the specular reflection image data are output to an image processing apparatus 26 described below.

In a case where the scanner 10 is not used as a texture scanner, the object 12 is irradiated with light having an incidence angle of 45° with respect to the normal direction of the object 12 from the light source 18 or the light source 20, and diffusely reflected light from the object 12 is detected. In a case where the scanner 10 is used as a texture scanner, in addition to diffusely reflected light, the object 12 is irradiated with light having an incidence angle of 10° with respect to the normal direction of the object 12 from the light source 22, and specularly reflected light from the object 12 is detected.

The diffuse reflection image data and the specular reflection image data are output to the image processing apparatus 26 that is an example of an information processing apparatus. A difference between the diffuse reflection image data and the specular reflection image data is calculated by the image processing apparatus 26, whereby information indicating the texture (for example, a glossy feeling) of the surface of the object 12 is generated.

Figure 2:
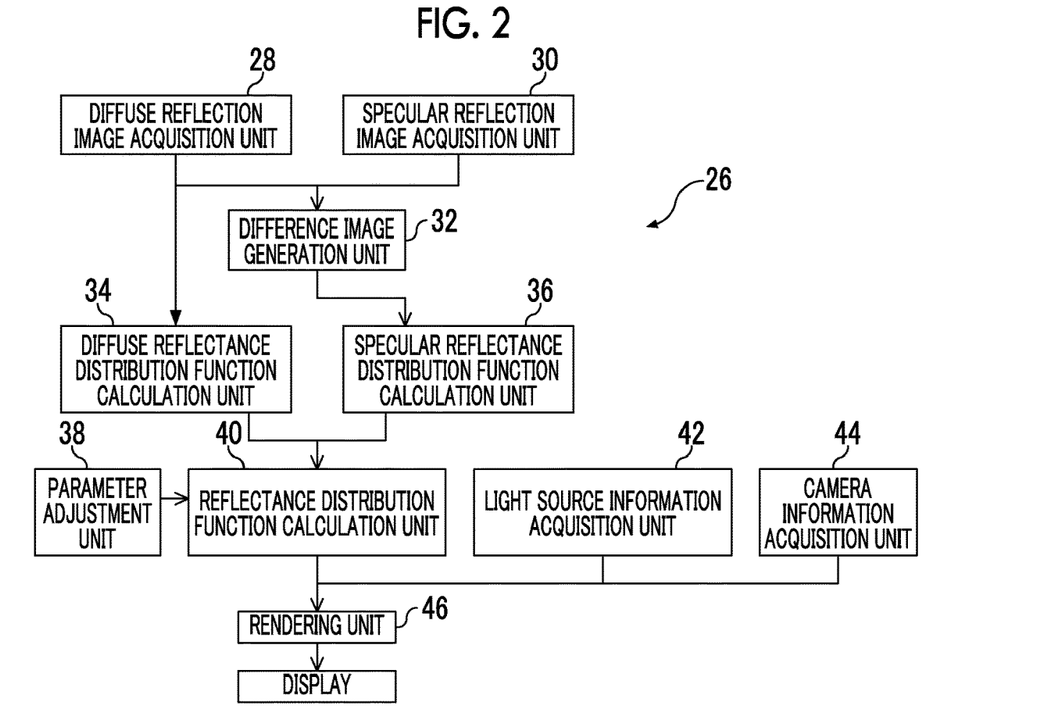
FIG. 2 is a block diagram showing functions of an image processing apparatus according to an exemplary embodiment.

Hereinafter, a configuration for generating image data that reproduces the characteristic of the surface of the object 12 will be described referring to FIG. 2. FIG. 2 shows an example of the configuration.

The image processing apparatus 26 includes a diffuse reflection image acquisition unit 28, a specular reflection image acquisition unit 30, a difference image generation unit 32, a diffuse reflectance distribution function calculation unit 34, a specular reflectance distribution function calculation unit 36, a parameter adjustment unit 38, a reflectance distribution function calculation unit 40, a light source information acquisition unit 42, a camera information acquisition unit 44, and a rendering unit 46.

The diffuse reflection image acquisition unit 28 acquires the diffuse reflection image data output from the sensor 24. The specular reflection image acquisition unit 30 acquires the specular reflection image data output from the sensor 24.

The difference image generation unit 32 calculates a difference between the diffuse reflection image data and the specular reflection image data to generate difference image data. The difference image data includes two kinds of (specular reflection image data—diffuse reflection image data) and (diffuse reflection image data—specular reflection image data), and the difference image generation unit 32 calculates at least one piece of difference image data.

The diffuse reflectance distribution function calculation unit 34 calculates a diffuse reflectance distribution function of the object 12 using the diffuse reflection image data. For example, the diffuse reflectance distribution function calculation unit 34 defines a diffuse reflectance distribution function as $\rho d \cdot \cos \theta i$ where $\rho d$ is diffuse reflectance to incident light and $\theta i$ is an incidence angle, following a reflection model of Lambert, and calculates diffuse reflectance $\rho d$ as a parameter from the diffuse reflection image.

The specular reflectance distribution function calculation unit 36 calculates a specular reflectance distribution function of the object 12 using the difference image data. For example, the specular reflectance distribution function calculation unit 36 defines a specular reflectance distribution function as $\rho s \cdot \cos^n \gamma$ where $\rho s$ is specular reflectance, $\gamma$ is an angle between a specular reflection direction and a sight direction, and n is a specular reflection index, following a reflection model of Phong, and calculates specular reflectance $\rho s$ and n as parameters from the difference image data. In a case where two pieces of difference image data are acquired in the difference image generation unit 32, and the specular reflectance distribution function is calculated using the two pieces of difference image data, the specular reflectance distribution function calculation unit 36 defines a specular reflectance distribution function as $\rho s1 \cdot \cos^{n1} \gamma$ for the difference image data (specular reflection image data—diffuse reflection image data), defines a specular reflectance distribution function as $\rho s2 \cdot \cos^{n2} \gamma$ for the difference image data (diffuse reflection image data—specular reflection image data), and calculates $\rho s1$, $\rho s2$, $n1$, and $n2$ as parameters from each piece of difference image data.

The reflectance distribution function calculation unit 40 calculates a reflectance distribution function of each pixel of the object 12 using the diffuse reflectance distribution function calculated by the diffuse reflectance distribution function calculation unit 34 and the specular reflectance distribution function calculated by the specular reflectance distribution function calculation unit 36. For example, the reflectance distribution function calculation unit 40 calculates the reflectance distribution function by "reflectance distribution function=diffuse reflectance distribution function+specular reflectance distribution function" following the reflection model of Lambert and the reflection model of Phong.

The rendering unit 46 executes rendering processing of a three-dimensional model on a virtual screen set in a virtual three-dimensional space to reproduce the texture of the surface of the object 12 as CG and display CG on a display based on the reflectance distribution function calculated by the reflectance distribution function calculation unit 40, various parameters set by the parameter adjustment unit 38, light source information (for example, information indicating a light source direction) acquired by the light source information acquisition unit 42, and camera information (for example, information indicating the sight direction) acquired by the camera information acquisition unit 44. That is, an image based on image data capable of reproducing the texture of the surface of the object 12 is displayed on the display. The rendering processing is known, and the rendering processing may be executed, for example, using a radiosity method or a ray tracing method taking into consideration inter-reflection.

Figure 3:
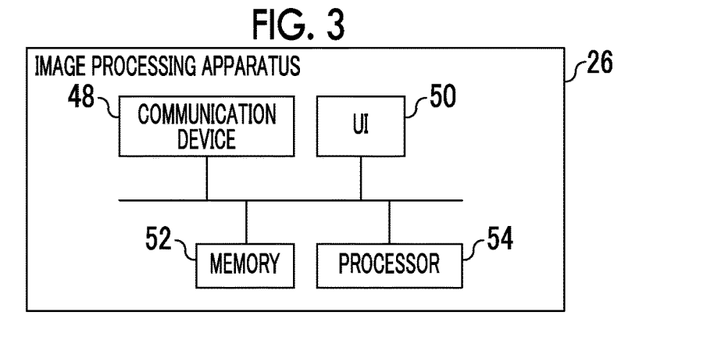
FIG. 3 is a block diagram showing the configuration of hardware of the image processing apparatus according to the exemplary embodiment.

Hereinafter, the configuration of hardware of the image processing apparatus 26 will be described referring to FIG. 3. FIG. 3 shows an example of the configuration of hardware of the image processing apparatus 26.

The image processing apparatus 26 includes, as the configuration of hardware, a communication device 48, a user interface (hereinafter, referred to as "UI") 50, a memory 52, and a processor 54.

The communication device 48 includes one or a plurality of communication interfaces having a communication chip, a communication circuit, or the like, and has a function of transmitting information to other apparatuses and a function of receiving information from other apparatuses. The communication device 48 may have a wireless communication function or may have a wired communication function.

The UI 50 is a user interface and includes a display and an input device. The display is a liquid crystal display, an EL display, or the like. The input device is a keyboard, a mouse, input keys, an operation panel, or the like. The UI 50 may be a UI, such as a touch panel with a display and an input device.

The memory 52 is a device that configures one a plurality of storage areas where data is stored. The memory 52 is, for example, a hard disk drive (HDD), a solid state drive (SSD), various memories (for example, a RAM, a DRAM, an NVRAM, and a ROM), other storage devices (for example, an optical disc), or a combination thereof.

The processor 54 controls the operation of each unit of the image processing apparatus 26.

For example, the memory 52 stores the diffuse reflection image data and the specular reflection image data.

The processor 54 functions as the difference image generation unit 32, the diffuse reflectance distribution function calculation unit 34, the specular reflectance distribution function calculation unit 36, the reflectance distribution function calculation unit 40, and the rendering unit 46. The processor 54 reads the diffuse reflection image data and the specular reflection image data stored in the memory 52, calculates the difference between the diffuse reflection image data and the specular reflection image data, and stores the generated difference image data in the memory 52. The processor 54 reads the diffuse reflection image data stored in the memory 52 to calculate the diffuse reflectance distribution function and to store the parameter of the diffuse reflectance distribution function in the memory 52, and reads the difference image data stored in the memory 52 to calculate the specular reflectance distribution function and to store the parameters of the specular reflectance distribution function in the memory 52. The processor 54 calculates the reflectance distribution function, for example, as a sum of the diffuse reflectance distribution function and the specular reflectance distribution function, and displays change in reflected color of the object 12 depending on a difference in angle viewed or incidence angle of light using the reflectance distribution function on the display.

The image processing apparatus 26 may be included in the scanner 10, and information indicating the texture may be generated by the scanner 10. Of course, the image processing apparatus 26 may not be included in the scanner 10 and may be used as an apparatus separate from the scanner 10.

Hereinafter, it is assumed that optically scanning the characteristic of the surface of the object 12 is referred to as "scanning". The surface of the object 12 is irradiated and scanned with light from the light source 18 or the light source 20, whereby the diffuse reflection image data is generated. The surface of the object 12 is irradiated and scanned with light from the light source 22, whereby the specular reflection image data is generated.

In the exemplary embodiment, the scanner 10 scans the surface of the object 12 at least two times or at least three times while changing the light source, thereby generating a plurality of pieces of image data. The processor 54 of the image processing apparatus 26 receives the plurality of pieces of image data and determines whether or not a position of the object 12 between respective scanning, based on the plurality of image data. The processor 54 combines two pieces of image data (that is, the diffuse reflection image data and the specular reflection image data) acquired using different light sources or does not combine the two pieces of image data, depending on a determination result. Combining the two pieces of image data generates image data that reproduces the texture of the surface of the object 12 through the processing described referring to FIG. 2. Hereinafter, each example of the exemplary embodiment will be described.

Example 1

In Example 1, the scanner 10 scans the surface of the object 12 at least two times while changing the light source, to generate a plurality of pieces of image data. Specifically, the scanner 10 irradiates the object 12 with light from the light source 18 or the light source 20 to generate diffuse reflection image data in first scanning and irradiates the object 12 with light from the light source 22 to generate specular reflection image data in second scanning. In this example, the light source 18 or the light source 20 corresponds to an example of a first light source, and the light source 22 corresponds to an example of a second light source.

In the first scanning, the object 12 may be irradiated with light from the light source 20 and the specular reflection image data may be generated, and in the second scanning, the object 12 may be irradiated with light from the light source 18 or the light source 20 and the diffuse reflection image data may be generated. In the example of the scanning, the light source 22 corresponds to an example of a first light source, and the light source 18 or the light source 20 corresponds to an example of a second light source.

In a case where third scanning is performed, the scanner 10 irradiates the object 12 with light from the light source used in the first scanning to generate image data.

In a case where the light source used in the first scanning is the light source 18 or the light source 20, the scanner 10 irradiates the object 12 with light from the light source 18 or the light source 20 to generate the diffuse reflection image data in the third scanning.

In a case where the light source used in the first scanning is the light source 22, the scanner 10 irradiates the object 12 with light from the light source 22 to generate the specular reflection image data in the third scanning.

The processor 54 of the image processing apparatus 26 receives a plurality of pieces of image data (for example, diffuse reflection image data and the specular reflection image data) generated by at least two times of scanning and determines whether or not the position of the object 12 is changed between respective scanning, based on the plurality of pieces of image data. The concept of the position of the object 12 also includes an inclination of the object 12.

Hereinafter, image data generated by first scanning is referred to as "first image data", image data generated by second scanning is referred to as "second image data", and image data generated by third scanning is referred to as "third image data".

For example, in a case where the light source 18 or the light source 20 is used in the first scanning, and the light source 22 is used in the second scanning, the first image data is diffuse reflection image data, and the second image data is specular reflection image data. In a case where the third scanning is performed under this condition, the third image data is diffuse reflection image data.

As another example, in a case where the light source 22 is used in the first scanning, and the light source 18 or the light source 20 is used in the second scanning, the first image data is specular reflection image data, and the second image data is diffuse reflection image data. In a case where the third scanning is performed under this condition, the third image data is specular reflection image data.

For example, the processor 54 collates the first image data (for example, diffuse reflection image data) generated by the first scanning with the second image data (for example, specular reflection image data) generated by the second scanning, and determines whether or not a result of the collation is included within an allowable range.

Collating the first image data with the second image data is, for example, collating an edge of the object 12 represented in the first image data with an edge of the object 12 represented in the second image data, and specifically, is comparing a position of the edge of the object 12 represented in the first image data with a position of the edge of the object 12 represented in the second image data.

The processor 54 extracts the edge of the object 12 from the first image data and extracts the edge of the object 12 from the second image data. As processing of extracting the edge from the image data, for example, known edge extraction processing is used. For example, in a case where the object 12 is a document, such as a sheet, the processor 54 extracts an edge of the document from each of the first image data and the second image data. As the edge, a contour, a vertex, or the like of the document may be extracted.

The processor 54 calculates a difference between the positions of both edges extracted respectively from the first image data and the second image data, and determines whether or not the difference is included within an allowable range.

The allowable range is determined in advance. For example, in a case where image data that reproduces the texture of the surface of the object 12 is generated based on the diffuse reflection image data and the specular reflection image data through the processing described referring to FIG. 2, the allowable range is determined from a viewpoint of whether or not the image data is allowed as image data that reproduces the texture of the surface of the object 12. For example, the allowable range is determined from a viewpoint of whether or not the image data accurately reproduces the texture of the surface of the object 12.

The difference between the positions of both edges means that the position of the object 12 is changed between the first scanning and the second scanning. As the difference is greater, this means that change in position of the object 12 is greater. As the change in position of the object 12 is greater, the image data that accurately reproduces the texture of the surface of the object 12 is not generated, and on the contrary, as the change in position of the object 12 is smaller, the image data that accurately reproduces the texture of the surface of the object 12 is generated. In a case where the difference between the positions of both edges is included within the allowable range, it is presumed that the image data that accurately reproduces the texture of the surface of the object 12 is generated, and in a case where the difference between the positions of both edges is not included within the allowable range, it is presumed that the image data that accurately reproduces the texture of the surface of the object 12 is not generated.

Even though the object 12 to be a target of scanning is the same object between the first scanning and the second scanning, since the first light source and the second light source are different light sources, the first image data and the second image data are strictly different pieces of image data. For this reason, the processor 54 extracts the edge of the object 12 represented in each of the first image data and the second image data and collates the extracted edges.

In a case where a result of the collation of the first image data with the second image data is included within the allowable range, that is, in a case where the difference between the positions of both edges is included within the allowable range, the processor 54 combines the first image data and the second image data. That is, the processor 54 generates image data that reproduces the characteristic of the surface of the object 12, from the first image data and the second image data through the processing described referring to FIG. 2.

In a case where the result of the collation of the first image data with the second image data is not included within the allowable range, that is, in a case where the difference between the positions of both edges is not included within the allowable range, the processor 54 collates the second image data with the third image data. That is, the processor 54 extracts the edge of the object 12 from the second image data, extracts the edge of the object 12 from the third image data, calculates a difference between the positions of both extracted edges, and determines whether or not the difference is included within the allowable range. In a case where the difference is not included within the allowable range, the processor 54 combines the second image data and the third image data. That is, the processor 54 generates image data that reproduces the characteristic of the surface of the object 12, from the second image data and the third image data, through the processing described referring to FIG. 2.

In a case where the third scanning is not performed, and the third image data is not generated, the processor 54 instructs the scanner 10 to execute the third scanning. The scanner 10 executes the third scanning in response to the instruction to generate the third image data. That is, the scanner 10 irradiates the object 12 with light from the first light source used in the first scanning to generate the third image data. The processor 54 receives the third image data collates the second image data with the third image data.

Figure 4:
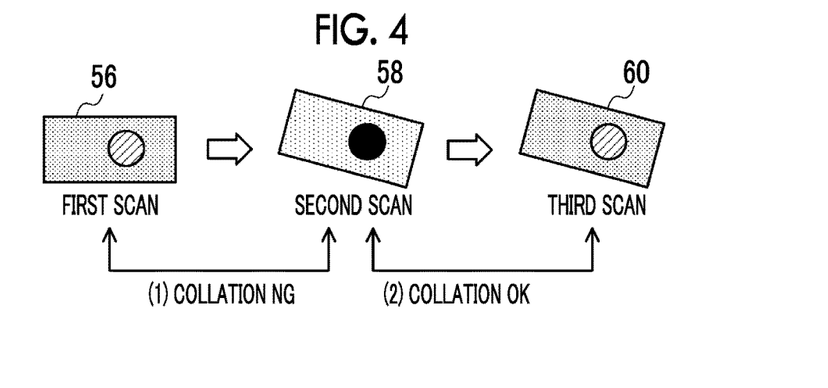
FIG. 4 is a diagram showing image data generated in Example 1.

Hereinafter, Example 1 will be described in detail referring to FIG. 4. FIG. 4 shows image data generated in Example 1.

An image 56 is the first image data (for example, diffuse reflection image data) generated by the first scanning. An image 58 is the second image data (for example, specular reflection image data) generated by the second scanning. An image 60 is the third image data (for example, diffuse reflection image data) generated by the third scanning.

Here, as an example, the object 12 is a document, such as a sheet, the document is provided on the platen glass 14, and each scanning is performed. The images 56, 58, and 60 are image data representing the document. In a case where a result of collation of the images 56 and 58 is included within the allowable range, the third scanning is not executed.

The processor 54 collates the image 56 with the image 58. Specifically, the processor 54 extracts an edge of the object 12 represented in the image 56, and extracts an edge of the object 12 represented in the image 58. The processor 54 determines whether or not a difference between a position of the edge extracted from the image 56 and a position of the edge extracted from the image 58 is included within the allowable range.

In the example shown in FIG. 4, the object 12 represented in the image 58 is inclined with respect to the object 12 represented in the image 56. That is, the edge extracted from the image 58 is inclined with respect to the edge extracted from the image 56. In this example, the processor 54 determines that the difference between the position of the edge extracted from the image 56 and the position of the edge extracted from the image 58 is not included within the allowable range (in FIG. 4, "(1) collation NG"). For example, it is considered that, since the position of the object 12 is changed between the first scanning and the second scanning, and the change in position is reflected in the image 58, the collation is NG.

In a case where the collation of the image 56 with the image 58 is NG, that is, in a case where the result of the collation is not included within the allowable range, the processor 54 may display information indicating that the result of the collation is not included within the allowable range, on the display. For example, the processor 54 displays a message, such as a text string, indicating that the result of the collation is NG, on the display of the UI 50. The processor 54 may display a message for prompting a user not to move the object 12 while scanning is performed, on the display.

In a case where the collation of the image 56 with the image 58 is NG, the processor 54 collates the image 58 with the image 60. Specifically, the processor 54 extracts an edge of the object 12 represented in the image 60, and determines whether or not a difference between the position of the edge extracted from the image 58 and a position of the edge extracted from the image 60 is included within the allowable range. In a case where the third scanning is not executed, and the image 60 is not generated, the processor 54 instructs the scanner 10 to execute the third scanning to acquire the image 60.

In the example shown in FIG. 4, the processor 54 determines that the difference between the position of the edge extracted from the image 58 and the position of the edge extracted from the image 60 is included within the allowable range (in FIG. 4, "(2) collation OK"). For example, determination is made that the position of the object 12 is not changed between the second scanning and the third scanning, or even though the position is changed, the change (that is, misregistration) is included within the allowable range, and the difference between the positions is within the allowable range, from the images 58 and 60.

In a case where the collation of the images 58 and 60 is OK, the processor 54 combines the image 58 and the image 60. With this, image data that reproduces the characteristic of the surface of the object 12 is generated.

In a case where the collation is OK, the processor 54 may display information indicating that the result of the collation is included within the allowable range, on the display of the UI 50. For example, the processor 54 displays a message, such as a text string, indicating that the collation is OK, on the display of the UI 50. The processor 54 may display a message that the object 12 (for example, a document) may be removed from the platen glass 14, or the like on the display.

In a case where the collation of the images 56 and 58 is OK, the processor 54 combines the image 56 and the image 58 to generate image data that reproduces the characteristic of the surface of the object 12. In this case, the third scanning is not executed.

As described above, even though the collation of the images 56 and 58 is NG, in a case where the collation of the images 58 and 60 is OK, the image data that reproduces the characteristic of the surface of the object 12 is generated using the images 58 and 60. That is, even in a case where the position of the object 12 is changed between the first scanning and the second scanning, and the difference between the positions is not included within the allowable range, in a case where the collation of the result of the second scanning with the result of the third scanning is OK, the image data that reproduces the characteristic of the surface of the object 12 is generated using the images 58 and 60. Since the image data that reproduces the characteristic of the surface of the object 12 is generated using the result of the third scanning, it is possible to suppress the number of times of scanning to be restarted to once.

As restarting of scanning, it is considered that two times of scanning (for example, scanning using the light source 18 or the light source 20 and scanning using the light source 22) are restarted again after the second scanning. In this case, there is a need to perform at least four times of scanning in total.

In contrast, in Example 1, in a case where the third scanning is performed and the collation of the images 58 and 60 is OK, since there is no need to perform fourth scanning, it is possible to suppress the number of times of scanning to be restarted to once.

In a case where the collation of the second image data with the third image data is NG (for example, the collation of the images 58 and 60 is NG), the processor 54 may instruct the scanner 10 to execute the fourth scanning. The fourth scanning is scanning using the second light source used in the second scanning.

The processor 54 collates the third image data generated by the third scanning with fourth image data generated by the fourth scanning. In a case where the collation is OK, the processor 54 combines the third image data and the fourth image data to generate the image data that reproduces the characteristic of the surface of the object 12.

In a case where collation is NG, the processor 54 may display an error message on the display of the UI 50.

Fifth or more scanning may be executed. In this case, the light source is switched to first light source or the second light source for each scanning to perform scanning. The number of times of scanning may be determined in advance or may be set by the user.

Example 2

In Example 2, the scanner 10 performs scanning at least three times while changing a light source, thereby generating a plurality of pieces of image data. Specifically, the scanner 10 irradiates the object 12 with light from the light source 18 or the light source 20 to generate diffuse reflection image data in first scanning, irradiates the object 12 with light from the light source 22 to generate specular reflection image data in second scanning, and irradiates the object 12 with light from the light source 18 or the light source 20 to generate diffuse reflection image data in third scanning. In this example, the light source 18 or the light source 20 corresponds to an example of a first light source, and the light source 22 corresponds to an example of a second light source.

As in Example 1, the light source 22 may be used in the first and third scanning, and the light source 18 or the light source 20 may be used in the second scanning.

The processor 54 collates first image data (for example, diffuse reflection image data) generates by the first scanning using the first light source with third image data (for example, diffuse reflection image data) generated by the third scanning using the same first light source, and determines whether or not a result of the collation is included within the allowable range.

In a case where the result of the collation is included within the allowable range, the processor 54 combines second image data (for example, specular reflection image data) generated by the second scanning using the second light source and any one of the first image data or the third image data to generate the image data that reproduces the characteristic of the surface of the object 12.

Figure 5:
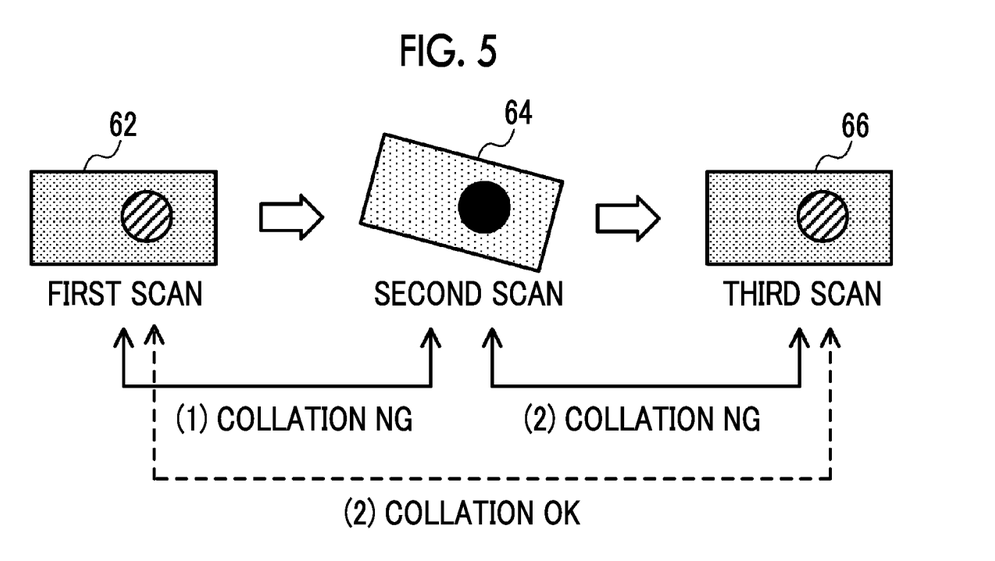
FIG. 5 is a diagram showing image data generated in Examples 2 and 3.

Hereinafter, Example 2 will be described in detail referring to FIG. 5. FIG. 5 shows image data generated in Example 2.

An image 62 is the first image data (for example, diffuse reflection image data) generated by the first scanning. An image 64 is the second image data (for example, specular reflection image data) generated by the second scanning. An image 66 is the third image data (for example, diffuse reflection image data) generated by the third scanning.

Here, as an example, the object 12 is a document, such as a sheet, the document is provided on the platen glass 14, and each scanning is performed. The images 62, 64, and 66 are image data representing the document.

The processor 54 collates the image 62 generated by the first scanning with the image 66 generated by the third scanning. Specifically, the processor 54 extracts an edge of the object 12 represented in the image 62, and extracts an edge of the object 12 represented in the image 66. The processor 54 determines whether or not a difference between a position of the edge extracted from the image 62 and a position of the edge extracted from the image 66 is included within the allowable range.

In the example shown in FIG. 5, the processor 54 determines that the difference between the position of the edge extracted from the image 62 and the position of the edge extracted from the image 66 is included within the allowable range (in FIG. 5, "(3) collation OK"). For example, determination is made that the position of the object 12 is not changed between the first scanning and the third scanning or even though the position is changed, the change (that is, misregistration) is within the allowable range, the difference between the positions is within the allowable range from the images 62 and 66.

In a case where the collation of images 62 and 66 is OK, the processor 54 combines the image 64 and any one of the image 62 or the image 66. With this, image data that reproduces the characteristic of the surface of the object 12 is generated. In this case, the processor 54 may display a message indicating that the collation is OK or a message that the object 12 may be removed, on the display of the UI 50.

In a case where the collation of the images 62 and 66 is NG, the processor 54 display a message indicating that the collation is NG or an error message on the display of the UI 50.

In a case where the collation of the images 62 and 66 is NG, fourth scanning using the second light source may be executed, and the second image data generated by the second scanning may be collated with fourth image data generated by the fourth scanning.

In a case where the collation is OK, the processor 54 may combine the third image data and any one of the second image data or the fourth image data to generate image data that reproduces the characteristic of the surface of the object 12.

In a case where collation is NG, the processor 54 may display an error message on the display of the UI 50. As in Example 1, fifth or more scanning may be executed.

Even in a case of collating the edges, in a case where the object 12 is a document, such as a hologram, all generated image data may be different due to different light sources. For example, in a case of collating image data generated using the first light source with image data generated using the second light source, even though the position of the object 12 is not changed between scanning, the collation may be NG. This is due to a difference between the light sources.

For example, the object 12 that is represented in the image 64 generated by the second scanning is disposed to be inclined with respect to the object 12 that is represented in the image 62 generated by the first scanning. For example, in a case of collating the image 62 with the image 64, the collation is NG (in FIG. 5, "(1) collation NG"). Even in a case where an actual position of the object 12 is not changed between the first scanning and the second scanning, in a case of comparing the image 62 with the image 64, since the position of the object 12 seems to be changed on the images, the collation is NG. This is due to a difference between the light sources. The same applies to a case of collating the image 64 with the image 66 (in FIG. 5, "(2) collation NG").

In Example 2, since the first image data and the third image data generated using the same light source (for example, the first light source) are collated, the collation is not NG due to a difference between light sources. Then, in a case where the collation of the first image data with the third image data is OK, it can be presumed that the position of the object 12 is not changed between the first scanning and the third scanning or even though the position is changed, the change is included within the allowable range. In a case where the collation of the first image data with the third image data is NG, it is presumed that the position of the object 12 is changed between the first scanning and the third scanning, and the change is not included within the allowable range. In this way, in Example 2, it is possible to restrain erroneous determination that the collation is NG due to a difference between light sources, and to determine whether or not the position of the object 12 is changed.

Example 3

In Example 3, the scanner 10 performs scanning at least two times while changing a light source, thereby generating a plurality of pieces of image data. Specifically, the scanner 10 irradiates the object 12 with light from the light source 18 or the light source 20 to generate diffuse reflection image data in first scanning and irradiates the object 12 with light from the light source 22 to generate specular reflection image data in second scanning. In this example, the light source 18 or the light source 20 corresponds to an example of a first light source, and the light source 22 corresponds to an example of a second light source.

As in Example 1, the light source 22 may be used in the first scanning, and the light source 18 or the light source 20 may be used in the second scanning.

The processor 54 collates first image data generated by the first scanning using the first light source with second image data generated by the second scanning using the second light source, and determines whether or not a result of the collation is included within the allowable range.

In a case where the result of the collation of the first image data with the second image data is included within the allowable range, the processor 54 combines the first image data and the second image data to generate image data that reproduces the characteristic of the surface of the object 12.

In a case where the result of the collation of the first image data with the second image data is not included within the allowable range, the processor 54 instructs the scanner 10 to execute third scanning. The third scanning is scanning using the first light source as in the first scanning. The processor 54 collates third image data generated by the third scanning using the first light source with the first image data.

In a case where a result of the collation of the first image data with the third image data is included within the allowable range, as in Example 2, the processor 54 combines the second image data and any one of the first image data or the third image data to generate image data that reproduces the characteristic of the surface of the object 12.

In a case where the result of the collation of the first image data with the third image data is not included within the allowable range, as in Example 2, subsequent processing may be executed.

Hereinafter, Example 3 will be described in detail referring to FIG. 5.

First, the processor 54 collates the image 62 generated by the first scanning with the image 64 generated by the second scanning. In a case where a result of the collation is OK, the processor 54 combines the image 62 and the image 64 to generate image data that reproduces the characteristic of the surface of the object 12. In this case, the third scanning is not executed.

In the example shown in FIG. 5, the collation of the image 62 with the image 64 is NG (in FIG. 5, "(1) collation NG"). In this case, the processor 54 instructs the scanner 10 to execute third scanning. With this, the third scanning is executed, and the image 66 is generated. The processor 54 collates the image 62 generated by the first scanning with the image 66 generated by the third scanning.

In the example shown in FIG. 5, the collation of the image 62 with the image 66 is OK (in FIG. 5, "(3) collation OK"). In this case, the processor 54 combines the image 64 and the image 62 or the image 66 to generate image data that reproduces the characteristic of the surface of the object 12.

As described in Example 2, since the first light source for acquiring the images 62 and 66 and the second light source for acquiring the image 64 are different, even in a case where an actual position of the object 12 is not changed, determination may be made that the position of the object 12 is changed on the images. With the collation of the images 62 and 66 acquired using the same first light source, it is possible to restrain erroneous determination due to a difference between light sources.

In Example 3, in a case where the collation of the image 62 generated by the first scanning with the image 64 generated by the second scanning is OK, the image data that reproduces the characteristic of the surface of the object 12 is generated based on the images 62 and 64. In this case, since the third scanning is not executed, it is possible to suppress the number of times of scanning to two times depending on the result of the collation.

Even in Example 3, information indicating the result of the collation may be displayed on the display.

In Example 1 to Example 3 described above, the processor 54 may display a result of the combination of the image data on the display of the UI 50, and control the execution of the scanning to the object 12 in response to an instruction of the user.

For example, the processor 54 displays an image based on the image data that is generated by combining the first image data and the second image data, and reproduces the characteristic of the surface of the object 12, on the display of the UI 50. The processor 54 may display an image based on the image data that is generated by combining the second image data and the third image data, and reproduces the characteristic of the surface of the object 12, on the display of the UI 50.

The user refers to the image displayed on the display and instructs the presence or absence of re-scanning using the UI 50. In a case where re-scanning is instructed by the user, the processor 54 receives the instruction and instructs the scanner 10 to execute re-scanning. The scanner 10 executes scanning in response to the instruction to execute re-scanning. For example, the scanner 10 executes scanning using the first light source and scanning using the second light source. The processor 54 collates two pieces of image data generated by scanning, and in a case where the collation is OK, combines the two pieces of image data.

The user may designate a light source and may instruct re-scanning. In this case, the scanner 10 executes scanning using the light source designated by the user. The processor 54 collates image data generated by the scanning with image data generated by scanning using a light source different from the light source used in the scanning. In a case where the collation is OK, the processor 54 combines these pieces of image data.

The function of the image processing apparatus 26 is realized by cooperation of hardware and software as an example. For example, the processor reads and executes a program stored in a memory of each device, and the function of each device is realized. The program is stored in the memory by way of a recording medium, such as a CD or a DVD or by way of a communication path, such as a network.

In the embodiments above, the term "processor" refers to hardware in abroad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device). In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a first light source configured to detect diffusely reflected light from an object,
a second light source configured to detect specularly reflected light from the object, and
a processor configured to:
acquire a plurality of pieces of image data generated by scanning a surface of an object at least two times while changing a light source;
in a case where a result of a collation of first image data generated by a first scanning using the first light source with second image data generated by a second scanning using the second light source different from the first light source is included within an allowable range between a first position of a first edge the object in the first image data and a second position of a second edge of the object in the second image data, combine the first image data and the second image data to generate an image data representing the surface of the object which has been scanned; and
in a case where the result of collation of the first image data with the second image data is not included within the allowable range, collate third image data generated by a third scanning performed using the first light source with the second image data, and in a case where a result of the collation between the second image data and the third image data is included within the allowable range, combine the second image data and the third image data to generate the image data.

2. An information processing apparatus comprising:
a first light source configured to detect diffusely reflected light from an object,
a second light source configured to detect specularly reflected light from the object, and
a processor configured to:
acquire a plurality of pieces of image data generated by performing at least three times of scanning while changing a light source; and
in a case where a result of collation of first image data generated by a first scanning using the first light source with third image data generated by a third scanning using the first light source is included within an allowable range between a first position of a first edge the object in the first image data and a second position of a second edge of the object in the third image data, combine second image data generated by a second scanning using the second light source different from the first light source and any one of the first image data or the third image data to generate an image data representing a surface of the object which has been scanned.

3. The information processing apparatus according to claim 1, wherein the processor is configured to:
in a case where the result of the collation is not included within the allowable range, display information indicating that the result of the collation is not included within the allowable range, on a display.

4. The information processing apparatus according to claim 2, wherein the processor is configured to:
in a case where the result of the collation is not included within the allowable range, display information indicating that the result of the collation is not included within the allowable range, on a display.

5. The information processing apparatus according to claim 1, wherein the processor is configured to:
display the image data on a display, and
control an execution of scanning to the object in response to an instruction of a user.

6. The information processing apparatus according to claim 2, wherein the processor is configured to:
display the image data on a display, and
control an execution of scanning to the object in response to an instruction of a user.

7. The information processing apparatus according to claim 3, wherein the processor is configured to:
display the image data on the display, and
control an execution of scanning to the object in response to an instruction of a user.

8. The information processing apparatus according to claim 4, wherein the processor is configured to:
display the image data on the display, and
control an execution of scanning to the object in response to an instruction of a user.

9. A non-transitory computer readable medium storing a program causing a computer comprising a processor to execute a process comprising:
providing a first light source configured to detect diffusely reflected light from an object;
providing a second light source configured to detect specularly reflected light from the object;
acquiring, by the processor, a plurality of pieces of image data generated by scanning a surface of an object at least two times while changing a light source;
combining, by the processor, in a case where a result of collation of first image data generated by first scanning using the first light source with second image data generated by second scanning using the second light source different from the first light source is included within an allowable range between a first position of a first edge the object in the first image data and a second position of a second edge of the object in the second image data, the first image data and the second image data to generate an image data representing the surface of the object which has been scanned; and collating, by the processor, in a case where the result of collation of the first image data with the second image data is not included within the allowable range, third image data generated by third scanning performed using the first light source with the second image data, and combining, in a case where a result of the collation between the second image data and the third image data is included within the allowable range, the second image data and the third image data to generate the image data.

\* \* \* \* \*